US007136418B2

(12) United States Patent
Atlas et al.

(10) Patent No.: US 7,136,418 B2
(45) Date of Patent: Nov. 14, 2006

(54) SCALABLE AND PERCEPTUALLY RANKED SIGNAL CODING AND DECODING

(75) Inventors: Les E. Atlas, Seattle, WA (US); Mark S. Vinton, Seattle, WA (US)

(73) Assignee: University of Washington, Seattle, WA (US)

(*) Notice: Subject to any disclaimer, the term of this patent is extended or adjusted under 35 U.S.C. 154(b) by 1025 days.

(21) Appl. No.: 09/938,119

(22) Filed: Aug. 22, 2001

(65) Prior Publication Data

US 2002/0176353 A1 Nov. 28, 2002

Related U.S. Application Data

(60) Provisional application No. 60/288,506, filed on May 3, 2001.

(51) Int. Cl.
*H04B 14/04* (2006.01)
*H04J 11/00* (2006.01)
*H04L 12/54* (2006.01)
*G06K 9/00* (2006.01)

(52) U.S. Cl. ...................... 375/242; 370/203; 370/429; 382/128

(58) Field of Classification Search ................ 370/242, 370/203, 429; 382/128
See application file for complete search history.

(56) References Cited

U.S. PATENT DOCUMENTS 5,303,058 A * 4/1994 Fukuda et al. .............. 382/234
5,416,854 A * 5/1995 Fukuda et al. .............. 382/232
5,831,977 A * 11/1998 Dent .......................... 370/335
5,832,128 A * 11/1998 Suzuki ........................ 382/246
6,028,634 A * 2/2000 Yamaguchi et al. ... 375/240.16
6,198,830 B1 3/2001 Holube et al. .............. 381/321
2003/0053702 A1* 3/2003 Hu ............................ 382/238

OTHER PUBLICATIONS

Thomas Jim et al. (Undated) Human Computer Interaction with Global Information Spaces—Beyond Data Mining. infoviz@pnl.gov, http://www.pnl.gov/infoviz.

Noll, Peter. Sep. 1997. MPEG Digital Audio Coding. *IEEE Signal Processing Magazine* 59-81.

Tanaka, Y. and H. Kimura. 1994. Low-Bit-Rate Speech Coding Using a Two-Dimensional Transform of Residual Signals and Waveform Interpolation. *IEEE* I-173-I-176.

Brandenburg, Karlheinz. and Gerhard Stoll. Oct. 1994. ISO-MPEG-1 Audio: A Generic Standard for Coding of High-Quality Digital Audio. *J Audio Eng. Soc.* 780-792.

* cited by examiner

*Primary Examiner*—Khai Tran
*Assistant Examiner*—Cicely Ware
(74) *Attorney, Agent, or Firm*—Ronald M. Anderson

(57) ABSTRACT

A method and system for encoding and decoding an input signal in relation to the most perceptually relevant aspects of the input signal. A two-dimensional (2D) transform is applied to the input signal to produce a magnitude matrix and a phase matrix that can be inverse quantized by a decoder. A first column of coefficients of the magnitude matrix represents a mean spectral density (MSD) function of the input signal. Relevant aspects of the MSD function are encoded at a beginning of a data packet. The MSD function is also processed through a core perception model to determine bit allocation. The matrices are then quantized and priority ordered into a data packet, with the least perceptually relevant information at the end of the packet so that it may be ignored or truncated for scalability to the channel data rate capacity.

36 Claims, 6 Drawing Sheets

SCALABLE AND PERCEPTUALLY RANKED SIGNAL CODING AND DECODING

RELATED APPLICATIONS

This application claims priority from previously filed U.S. Provisional Patent Application Ser. No. 60/288,506, filed on May 3, 2001, the benefit of the filing date of which is hereby claimed under 35 U.S.C. §119(e).

GOVERNMENT RIGHTS

This invention was made under contract with the United States Office of Naval Research, under Grant #N00014-97-1-0501, subcontract #Z883401 (through the University of Maryland), "Analysis and Applications of Auditory Representations in Automated Acoustic Monitoring, Detection, and Recognition," and the United States Government may have certain rights in the invention.

FIELD OF THE INVENTION

The present invention generally relates to a method and system for encoding and decoding an input signal in relation to the most perceptually relevant aspects of the input signal; and more specifically, to a two-dimensional (2D) transform that is applied to the input signal to produce a magnitude matrix and a phase matrix that can be inverse quantized by a decoder.

BACKGROUND OF THE INVENTION

Digital representations of analog signals are common in many storage and transmission applications. A digital representation is typically achieved by first converting an analog signal to a digital signal using an analog-to-digital (A/D) converter. Prior to transmission or storage, this raw digital signal may be encoded to achieve greater robustness and/or reduced transmission bandwidth and storage size. The analog signal is subsequently retrieved using digital-to-analog (D/A) conversion. Storage media and applications employing digital representations of analog signals include, for example, compact discs (CDs), digital video discs (DVDs), digital audio broadcast (DAB), wireless cellular transmission, and Internet broadcasts.

While digital representations are capable of providing high fidelity, low noise, and signal robustness, these features are dependent upon the available data rate. Specifically, the quality of digital audio signals depends on the data rate used for transmitting the signal and on the signal sample rate and dynamic range. For example, CDs, which are typically produced by sampling an analog sound source at 44,100 Hz, with a 16-bit resolution, require a data rate of 44,100*16 bits per second (b/s) or 705.6 kilobits per second (kb/s). Lower quality systems, such as voice-only telephony transmission can be sampled at 8,000 Hz, requiring only 8,000*8 b/s or 64 kb/s.

For most applications, the raw data bit rate of digital audio is too high for the channel capacity. In such circumstances, an efficient encoder/decoder system must be employed to reduce the required data rate, while maintaining the quality. An example of such a system is Sony Corporation's MINI-DISC™ storage/playback device, which uses a 2.5 inch disc that can only hold 140 Mbytes of data. In order to hold 74 minutes of music sampled at 44,100 Hz with a resolution of 16 bits per sample (which would require 650 Mbytes of storage for the raw digital signal), an encoder/decoder system is employed to compress the digital data by a ratio of about 5:1. For this purpose, Sony employs the Adaptive Transform Acoustic Coding (ATRAC) encoder/decoder system.

Many commercial systems have been designed for reducing the raw data rate required to encode, store, decode, and playback analog signals. Examples for music include: Advanced Audio Coding (AAC), Transform-Domain Weighted Interleave Vector Quantization (TWINVQ), Dolby AC-2 and AC-3 compression schemes, Moving Pictures Experts Group (MPEG)-1 Layer 1 through Layer 3, and Sony's ATRAC and ATRAC3 systems. Examples for Internet broadcast of voice and/or music include the preceding coders and also: Algebraic Code-Excited Linear Prediction (ACELP)-Net, DolbyNET™ system, Real Network Corporation's REALAUDIO™ system, and Microsoft Corporation's WINDOWS MEDIA AUDIO™ (WMA) system.

These transform-based audio coders achieve compression by using signal representations such as lapped transforms, as discussed by H. Malvar in a paper entitled "Enhancing the Performance of Subband Audio Coders for Speech Signals" (*IEEE Int. Symp. On Circuits and Sys.,* Monterey, Calif., June 1998) and as discussed by T. Mirya et. al. in a paper entitled, "A Design of Transform Coder for Both Speech and Audio Signals at 1 bit/sample" (*IEEE ICASSP* '97, Munich, pp. 1371–1374, 1997). Other transform-based coders include pseudo-quadrature mirror filters, as discussed by P. Monta and S. Cheung in a paper entitled, "Low Rate Audio Coder with Hierarchical Filter Banks and Lattice Vector Quantization" (*IEEE ICASSP* '94, pp. II 209–212, 1994). Typically, these representations offer the advantage that quantization effects can be mapped to areas of the signal spectrum in which they are least perceptible. However, the current technologies have several limitations. Namely, the reproduction quality is not sufficiently good, particularly for Internet applications, in which it is desirable to transmit audio sampled at 44,100 Hz at data rates less than 32 kb/s.

Some research has explored 2D energetic signal representations where the second dimension is the transform of the time variability of signal spectra (see e.g., R. Drullman, J. M. Festen, and R. Plomp, "Effect of Temporal Envelope Smearing on Speech Reception," *J. Acoust. Soc. Am.* 95, pp. 1053–1064, 1994,) and Y. Tanaka and H. Kimura, "Low Bit-Rate Speech Coding using a Two-dimensional Transform of Residual Signals and Waveform Interpolation," (*IEEE ICASSP* '94, Adelaide, pp. I 173–176, 1994)). This second dimension has been called the "modulation dimension" (see e.g., S. Greenberg and B. Kingsbury, "The Modulation Spectrogram: In Pursuit of an Invariant Representation of Speech," (*IEEE ICASSP* '97, Munich, pp. 1647–1650, 1997)). When applied to signals such as speech or audio that are effectively stationary over relatively long periods, this second dimension projects most of the signal energy into a few low modulation frequency coefficients. Moreover, mammalian auditory physiology studies have shown that the physiological importance of modulation effects decreases with modulation frequency (see e.g., N. Kowalski, D. Depireux and S. Shamma, "Analysis of Dynamic Spectra in Ferret Primary Auditory Cortex: I. Characteristics of Single Unit Responses to Moving Ripple Spectra," *J. Neurophysiology* 76, pp. 3503–3523, 1996). This past work has provided an energetic, yet not invertible transform. Instead, what is needed is a transform that produces a signal, which after modification to a lower bit rate, is invertible back to a high-fidelity analog signal.

Furthermore, for bandwidth-limited applications, the current techniques employed for audio coder-decoders (CODECs) lack scalability. It is desirable to provide modulation frequency transforms that are indeed invertible after quantization to provide essentially CD-quality music coding at 32 kb/s per channel and to provide a progressive encoding that naturally and easily scales to bit rate changes. A scalable algorithm, as defined herein, is one that can change a data rate after encoding, by applying a simple truncation of frame size, which can be achieved without further computation. Such algorithms should provide service at any variable data rate, only forfeiting fidelity for a reduction in the data rate. This capability is essential for Internet broadcast applications, where the channel bandwidth is not only constrained, but is also time dependent.

SUMMARY OF THE INVENTION

The present invention provides a method and system for, encoding and decoding an input signal in relation to its most perceptually relevant aspects. As used in the claims that follow, the term "perceptual signal" is a specific type of input signal and refers specifically to a signal that includes audio and/or video data, i.e., data that can be used to produce audible sound and/or a visual display. A two-dimensional transform is applied to the input signal to produce a magnitude matrix and a phase matrix representing the input signal. The magnitude matrix has as it's two dimensions spectral frequency and modulation frequency. A first column of coefficients of the magnitude matrix represents a mean spectral density (MSD) function of the input signal. Relevant aspects of the MSD function are encoded at a beginning of a data packet (for later use by a decoder to recreate the input signal), based on an encoding of the magnitude and phase matrices appended within the rest of the data packet.

To package the magnitude and phase matrices (i.e., the data representing the input signal), the MSD function is first processed through a core perceptual model that determines the most relevant components of a signal and its bit allocations. The bit allocations are applied to the phase and magnitude matrices to quantize the matrices. The coefficients of the quantized matrices are prioritized based on the spectral frequency and modulation frequency location of each of the magnitude and phase matrix coefficients. The prioritized coefficients are then encoded into the data packet in priority order, so that the most perceptually relevant coefficients are adjacent to the beginning of the data packet and the least perceptually relevant coefficients are adjacent to an end of the data packet.

By prioritizing the MSD function and matrices data in the data packet, the most perceptually relevant information can be sent, stored, or otherwise utilized, using the available channel capacity. Thus, the least perceptually relevant information may not be added to the data packet before transmission, storage, or other utilization of the data. Alternatively, the least perceptually relevant information may be truncated from the data packet. Because only the least perceptually relevant information may be lost, the maximum achievable signal quality can be maintained, with the least significant losses possible. This method thus provides scalable and progressive data compression.

In one preferred embodiment, the 2D transform starts with a time domain aliasing cancellation (TDAC) filter bank, which provides a 50 percent overlap in time while maintaining critical sampling. The input signal, x[n], is windowed using a windowing function, $w_1[n]$, to achieve specific window constraints. The windowed input is then transformed by alternating between a modified discrete cosine transform (MDCT) and a modified discrete sine transform (MDST). Two adjacent MDCTs and MDSTs are combined into a single complex transform. The magnitude from the aforementioned transform is processed into a time-frequency distribution. The resulting 2D magnitude distribution is windowed across time in each frequency bin, again with a 50 percent overlap, and using a second windowing function, $w_2[n]$. A second transform, such as another MDCT, is computed to yield the magnitude matrix. In addition, a second transform can optionally be performed on the phase information. Preferably, unmodified phase data are encapsulated in a separate matrix.

As indicated above, the first column of coefficients of the magnitude matrix represents the MSD function coefficients of the input signal. Also as indicated above, relevant aspects of the MSD function are computed and stored in order, within the data packet. Specifically, in one preferred embodiment, the MSD coefficients are weighted according to a perceptual model of the most relevant components of a signal. The resulting weighting factors are then quantized and encoded into a beginning portion of a data packet. The weighting factors are also applied to the original unweighted first column coefficients. The resulting weighted MSD coefficients are quantized and encoded behind the encoded weighting factors. Weighted MSD coefficients are then inverse quantized and processed by the core perceptual model. The resulting bit allocation is applied to quantize the phase and magnitude matrices. Finally, the quantized matrices are encoded and priority ordered into the data packet. Decoding is a mirror process of the encoding process.

Another aspect of the invention is directed to a machine-readable medium on which are stored machine instructions that instruct a logical device to perform functions generally consistent with the steps of the method discussed above.

Yet another aspect of the present invention is directed to a system that includes a processor and a memory in which machine instructions are stored. When executed by the processor, the machine instructions cause the processor to carry out functions that are also generally consistent with the steps of the method discussed above—both when encoding an input signal and when decoding packets used to convey the encoded signal.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Encoding Process

Figure 1:
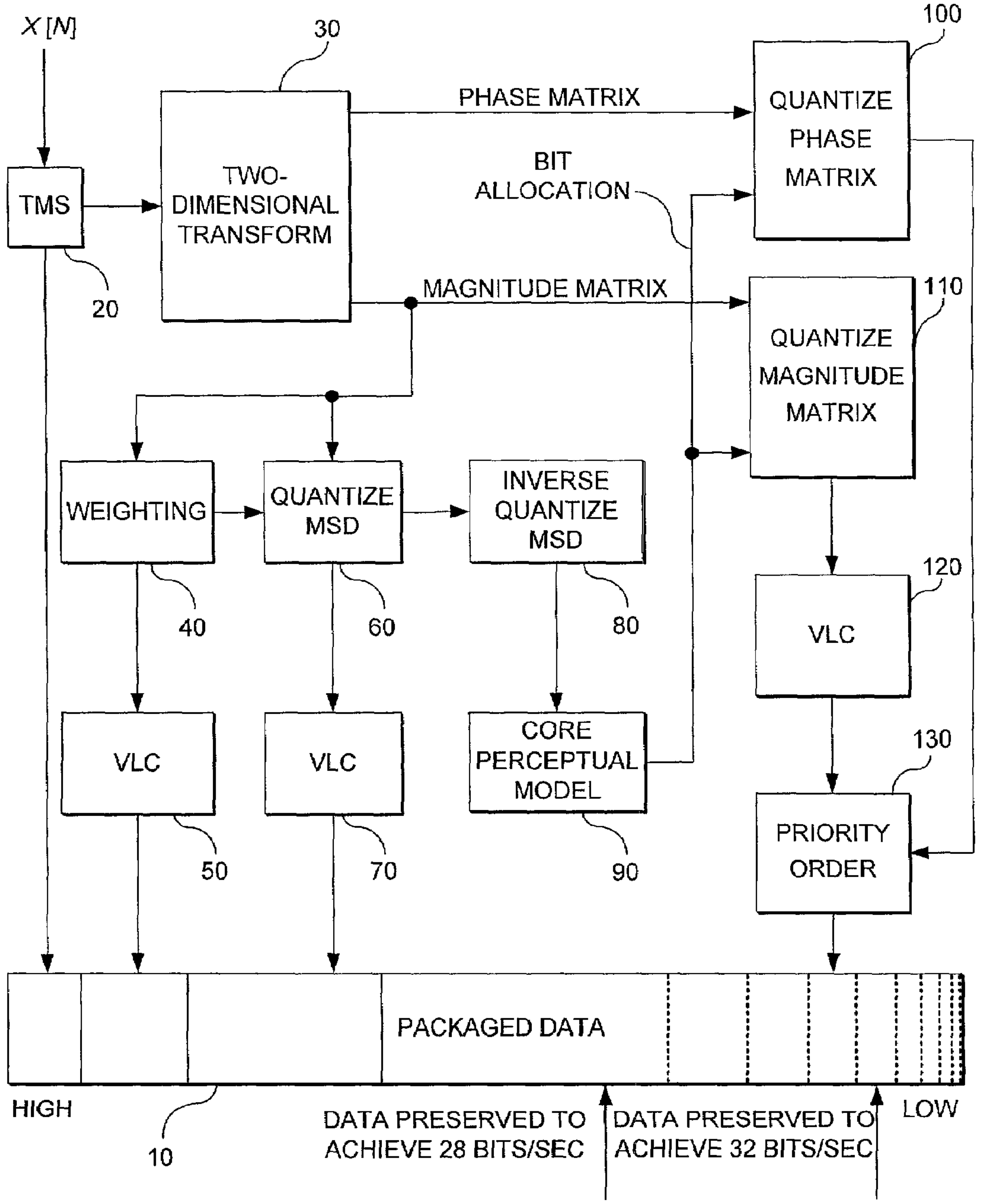
FIG. 1 is a flow diagram of a preferred embodiment of the overall encoding technique in relation to audio signals.

FIG. 1 illustrates the overall encoding process used in the present invention, in relation to an audio signal that comprises an input to the process. The intent of the encoding technique is to produce a prioritized data packet 10, with the most perceptually important data placed near the beginning of the data packet, i.e., near the portion of the data packet that is first transmitted. To achieve this goal, a new backward adaptive encoding architecture is applied. Adaptive signal coders can take on one of two fundamental frameworks: forward or backward adaptive. Forward adaptive architectures imply that the encoder makes all adaptive decisions and transmits pertinent information for decoding as side information. The benefits of such forward adaptive schemes are reduced decoder complexity; access to more detailed information, and an encoder structure that can be improved in isolation. Backward adaptive frameworks make adaptations based on transmitted data alone. Such backward adaptive structures give up the aforementioned benefits of the forward adaptive scheme in order to reduce the extra bits of side information. Use of a 2D transform, described in greater detail below with regard to FIG. 2, lends itself very well to the backward adaptive architecture and reduces side information, yet still offers detailed information for adaptive decisions.

To begin the encoding process, a digitized audio input signal is first passed through a transient management system (TMS) at a step 20. The TMS reduces losses prior to each occurrence of sharp transients in the input signal, often referred to as a pre-echo (i.e., an increase in the signal-to-noise ratio (SNR)). Preferably, a simple gain normalization procedure is used for the TMS. However, several other procedures may alternatively be used. One such procedure includes temporal noise shaping (TNS), as discussed by J. Herre and J. Johnston in a paper entitled "Enhancing the Performance of Perceptual Audio Coders by Using Temporal Noise Shaping (TNS)" (*Proc. 101$^{st}$ Conv. Aud. Eng. Soc.,* 1996, preprint 4384). An alternative procedure includes gain control, as discussed by M. Link in a paper entitled "An Attack Processing of Audio Signals for Optimizing the Temporal Characteristics of a Low Bit Rate Audio Coding System" (*Proc. 95$^{th}$ Conv. Aud. Eng. Soc.,* 1993, preprint 3696).

The normalized audio input signal is then processed by a 2D transform at a step 30. The first transform produces time varying spectral estimates, and the second transform produces a modulation estimate. The transforms produce a magnitude matrix and a phase matrix. The 2D transform is discussed in detail below, with regard to FIG. 2.

From the 2D transform, a first column of the magnitude matrix contains coefficients that represent an approximate mean spectral density function of the input signal. Prior art audio compression algorithms calculated a model of the human auditory system in order to later map noise generated by quantization into areas of the spectrum where they are least perceptible. Such models were based on an estimate of power spectral density of the incoming signal, which can only be accurately computed in the encoder. However, the 2D transform of the present invention has the advantage of providing an implicit power spectral density function estimate represented by the first column coefficients of the magnitude matrix (i.e., the MSD function coefficients).

At a step 40, the MSD function coefficients are input to a standard first perceptual model of the human auditory system. Such a first perceptual model is discussed in a paper by J. Johnston, entitled, "Transform Coding of Audio Signals Using Perceptual Noise Criteria" (*IEEE J. Select. Areas Commun.,* Vol. 6, pp. 314–323, February 1988). It is beneficial for this first perceptual model to be a complex model that provides accurate detail of the human auditory system. This first perceptual model is not used by the decoder and therefore need not be compact.

The first perceptual model is used to compute accurate weighting factors from the MSD function coefficients. The weighting factors are later used to whiten the MSD function (analogous to employing a whitening filter) and also to shape the noise associated with MSD quantization into unperceivable areas of the frequency spectrum. Thus, the weighting factors reduce the dynamic range. Preferably, approximately 25 weighting factors are produced. A simplified approach would be to extract peak values of the MSD function coefficients from frequency groups approximately representing the critical band structure of the human auditory system. The peak values would be simple scale factors that whiten the spectral energy, but do not shape the noise into unperceivable areas of the frequency spectrum.

The computed weighting factors are then converted to a logarithmic scale and are themselves quantized to a 1.5 dB precision. The quantized weighting factors are also inverse quantized to accurately mirror the inverse quantization that will be implemented by the decoder. The inverse quantized weighting factors are later used to prepare the MSD function for quantization.

The quantized weighting factors are encoded into the data packet, at a step 50, for later use in decoding. Preferably, the weighting factors are encoded according to the well known Huffman coding technique. However, those skilled in the art will recognize that other coding techniques may be used, such as entropy coding, or variable length coding (VLC).

At a step 60, the MSD function is quantized. Specifically, the MSD function coefficients are divided by the inverse quantized weighting factors, and the weighted MSD function is then quantized. Preferably, the weighted MSD function is quantized using a uniform quantizer, and the step size is selected such that a compressed MSD will consume approximately one bit per sample of the original MSD function. This function is implemented by a loop that increases or decreases the step size as necessary and repeats quantization to converge on one bit per sample of the original MSD function. Alternatively, quantization can be implemented via a lookup table, taking advantage of simple perceptual criteria.

The quantized MSD is encoded into the data packet at a step 70. Preferably, a run length coder and an arithmetic coder are employed to remove redundancy. However, other VLCs could be used, including the well known Huffman coding technique. Due to the slow non-stationarity of most audio inputs, the magnitude matrix displays very low entropy. Even with the use of only a single dimensional Huffman code, more than 40 percent of the redundancy is extracted. However, this approach is not an optimal coding technique. The run length coding and multi-dimensional variable length coding techniques lead to further gains. Note, however, that these methods may interfere with the desired scalability of the technique and may need to be avoided in some circumstances.

At a step 80, the MSD function is then inverse quantized. The inverse quantized MSD function is passed to a core perceptual model at a step 90. The core perceptual model (sometimes called a psychoacoustic model) can be the same as the first perceptual model discussed above. However, it is preferable that the core perceptual model be less complex and more compact than the first perceptual model. A compact core perceptual model will enable faster execution, which is more desirable for the decoder. The core perceptual model processes the inverse quantized MSD function to derive bit allocations for the remaining data. Bit allocations are made, based on the simple approximation that 6 dB of SNR is gained per bit allocated to the magnitude and phase matrix coefficients. In other words, for each bit, 6 dB of SNR is utilized. The backward adaptive structure that is used provides very high spectral resolution for bit allocation and hence, higher efficiency.

At a step 100, the phase matrix that resulted from the 2D transform is then quantized using the number of bits computed by the core perceptual model. Similarly, the magnitude matrix that resulted from the 2D transform is quantized at a step 110. The quantized magnitude matrix is then coded with a fixed or variable length code at a step 120 (preferably with a single dimensional Huffman code). The quantized phase matrix is not variable length coded, because it has a uniform distribution.

To ensure that the target rate is met, the data from the quantized phase matrix and encoded magnitude matrix are reordered at a step 130, into the data packet bit stream with respect to their perceptual relevance. Specifically, low modulation frequencies and low base-transform frequencies are inserted into the data packet bit stream first. High modulation frequencies and high base-transform frequencies are perceptually less important. If need be, the high frequencies can be removed without unacceptably adverse consequences. For example, for low data rates, the phase information (i.e., high base-transform frequencies) above 5 kHz are not transmitted. Instead the receiving decoder replaces the phase information with randomized phase. This process does not lead to significant perceptual loss, as shown by empirical tests conducted with 25 participants.

Because the perceptually important data is placed at the beginning of the data packet, transmission of the information in a single packet can simply be terminated as necessary to accommodate the target data rate, without causing annoying perceptual losses. For example, if a communication channel data rate capacity is less than the encoded data rate, the data packet is simply truncated to accommodate the channel limitations. This progressive aspect is fundamental to the scalability of the invention.

Two-Dimensional Transform Process

Figure 2:
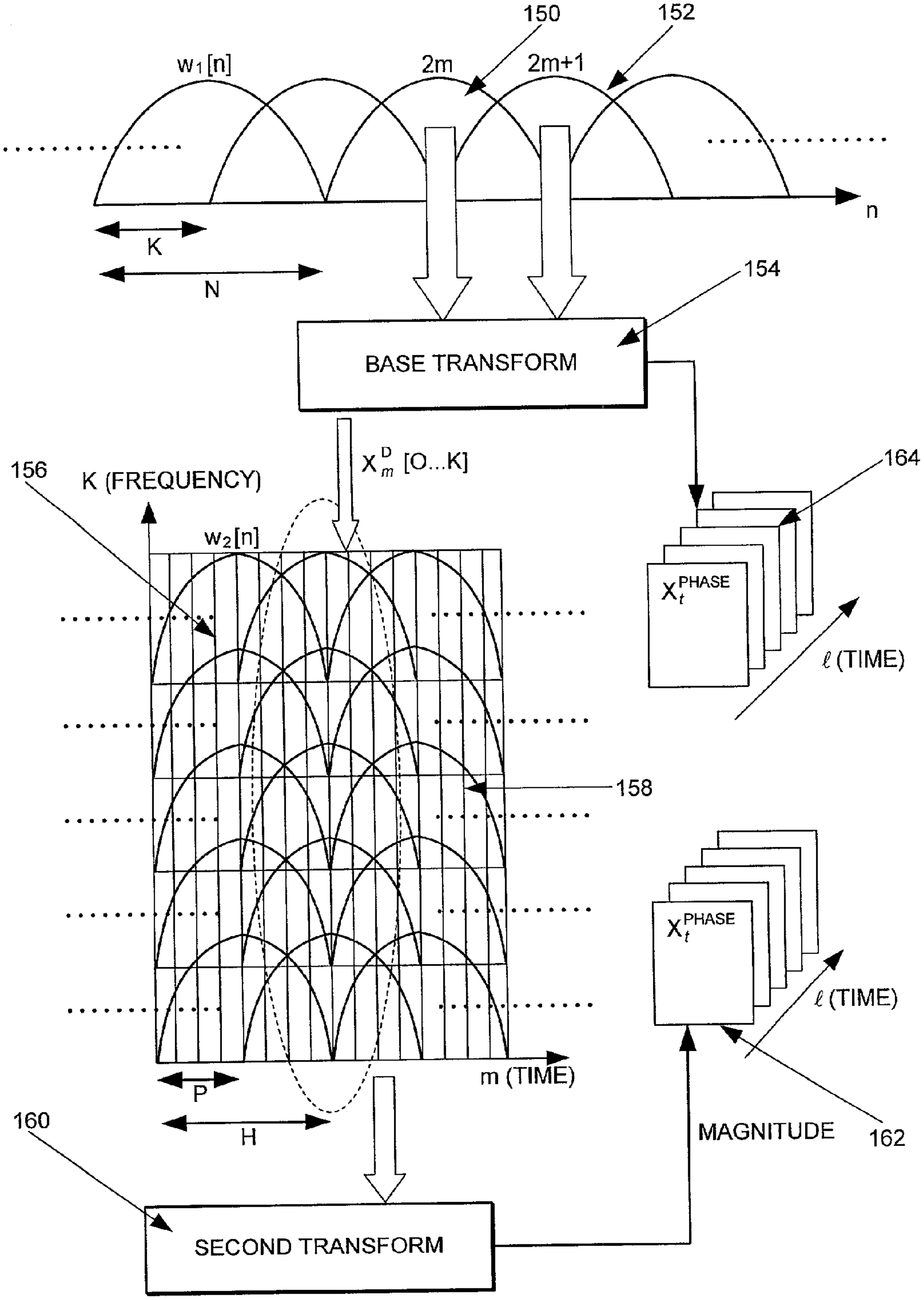
FIG. 2 is a pictographic diagram of the 2D transform process.

FIG. 2 is a pictographic diagram of the 2D transform process. Preferably, the 2D transform starts with a time domain aliasing cancellation (TDAC) filter bank. A suitable filter bank would be like that taught by Princen and Bradley ("Analysis/Synthesis Filter Bank Design Based on Time Domain Aliasing Cancellation," (*IEEE Trans. Acoust., Speech, and Signal Processing* 34, pp. 1153–1161, 1986)). The filter bank is applied to successive blocks of one-dimensional samples of audio data and provides a 50 percent overlap in time while maintaining critical sampling. Specifically, the input signal is windowed by a sine windowing function to achieve window constraints. The raw discrete input data, x[n], is then windowed by a window function $w_1[n]$, such as a sine windowing function, of size N. N is typically between about 256–1024 samples, and these samples are used to produce a window curve 150. The input is then shifted by 50 percent of the window size, which is represented by K=N/2. The shifted input data are then windowed as above, to produce an overlapping window curve 152. This process is repeated over the entire set of input data.

The window sequences are then transformed by a base transform process 154. This base transform can make use of any transform technique that provides a matrix of time samples of base transform coefficient magnitude and phase. Preferably, two base transforms are used. First, even numbered window sequences are transformed by a modified discrete cosine transform (MDCT), given by the following equation:

$$X_m^C[k] = \sqrt{\frac{2}{N}} \sum_{n=0}^{N-1} x[n + 2mK]w_1[n]\cos\left(\frac{2\pi(n + N_0)k}{N}\right);$$

for:

$$K = \frac{N}{2} N_0 = \frac{K+1}{2} \quad \text{where } k = 0, 1, \ldots, K-1;$$

and where:

n=time index k=frequency index m=window index

N=base transform size (i.e., total number of samples)

K=half base transform size $N_0$=time shift in basis function of MDCT/MDST $w_1[n]$=window function 1.

Second, the odd window sequences are transformed by a modified discrete sine transform (MDST), given by the following equation:

$$X_m^S[k] = \sqrt{\frac{2}{N}} \sum_{n=0}^{N-1} x[n + (2m+1)K]w_1[n]\sin\left(\frac{2\pi(n + N_0)k}{N}\right).$$

These two initial transforms are combined into an orthogonal complex pair by multiplying the odd transform sequence by j (i.e., by the square root of −1), represented by the equation:

$$X_m^D[k] = X_m^C[k] + jX_m^S[k].$$

The rectangular representation is converted into polar coordinates, namely:

R*power(e,j*a tan 2(Im(X),Re(X)).

The magnitude from the base transform is then reformatted into a 2D time frequency distribution 156. This distribution is windowed across time in each frequency bin by a second window function of size H, $w_2[n]$, such as a sine function. H is typically in the range from 8–64 samples, in each frequency subband (k) across the decimated time index (m), which are used to produce second window curves 158. Again, windowing can be performed with a 50 percent overlap between adjacent window sequences.

Each window sequence in each frequency subband is transformed by a second transform process 160. The second transform process could be another MDCT. For example, a modulated lapped transform (MLT) could be used, as given by the following equation with relation to the magnitude:

$$X_l^{Mag}[h,k]=\begin{bmatrix}\sqrt{\frac{2}{H}}\sum_{m=0}^{H-1}|X_{m+lP}^{D}[0]|\,w_2[m]\cos\left(\frac{2\pi(m+H_0)(h+0.5)}{H}\right)\\ \vdots\\ \sqrt{\frac{2}{H}}\sum_{m=0}^{H-1}|X_{m+lP}^{D}[K-1]|\,w_2[m]\cos\left(\frac{2\pi(m+H_0)(h+0.5)}{H}\right)\end{bmatrix};$$

for:

$$P=\frac{H}{2},\ H_0=\frac{P+1}{2}\ \text{ and }\ h=0,1,\ldots,P-1$$

and where:

h=modulation frequency index

H=second transform size

P=half second transform size $H_0$=time shift in basis function of second MDCT l=window index of second transform $w_2[m]$=window function 2.

The result of the second transform process is an oddly stacked TDAC transform of the audio signal in the form of a 2D magnitude matrix 162. The second transform is considered oddly stacked, because the second dimension sample variable is offset (e.g., h+0.5). Due to use of the sine window in the 2D transform, the direct current (dc) components of the successive first transforms (i.e., the successive magnitude spectral estimates) are isolated completely to the first coefficient of the second transform. Specifically, the first coefficient of the second transform represents an averaged estimate of the square root of the power spectral density. Correspondingly, the first column of coefficients of the magnitude matrix provides an implicit power spectral density estimate (i.e., the mean spectral density). These coefficients can be used to compute an accurate perceptual model and bit allocation in both the encoder and decoder.

Optionally, the base transform of the phase may be similarly reformatted, windowed, and processed with a second transform. However, the phase data are not as critical as the magnitude data. For computational simplicity, the phase components generated by the first transform are just formatted into a similar matrix representation 164, as given by the following equation:

$$X_l^{Phase}[h,k]=\begin{bmatrix}\arg(X_{lP}^{D}[k=0]) & \ldots & \arg(X_{lP+P-1}^{D}[k=0])\\ \vdots & \ddots & \vdots\\ \arg(X_{lP}^{D}[k=K-1]) & \ldots & \arg(X_{lP+P-1}^{D}[k=K-1])\end{bmatrix}.$$

Applying the windowing function and transform again on the separate magnitude (and optionally the phase) corresponds to one embodiment for detecting underlying modulation frequencies for all first-transform coefficients.

Two-Dimensional Transform Applied to Audio Signal

Figure 3A:
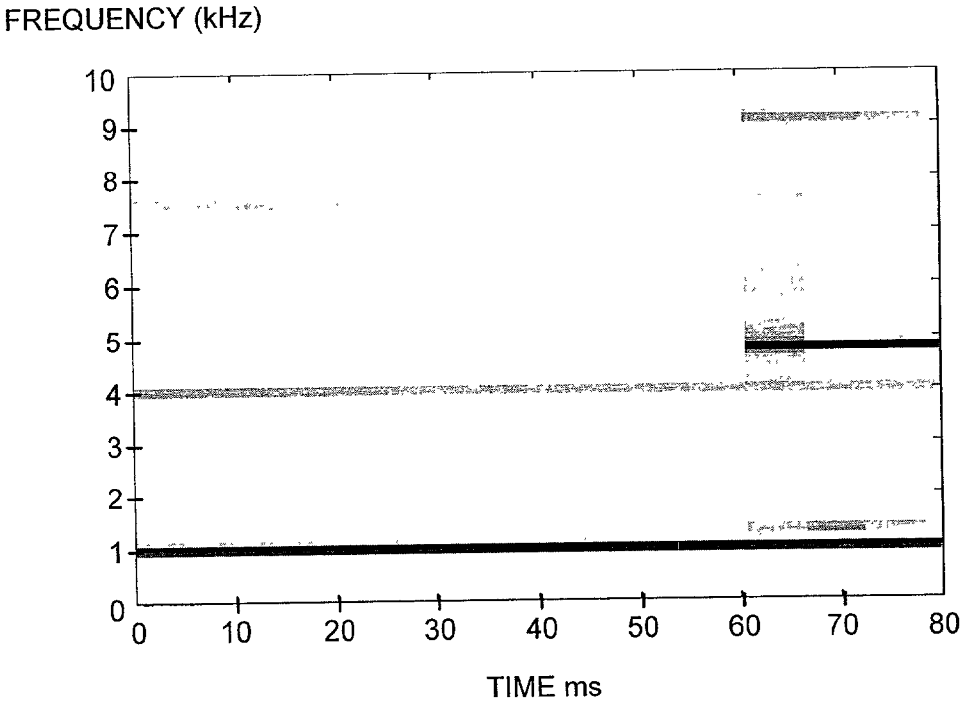
FIG. 3A is a graph showing the spectrogram of two notes of a glockenspiel musical instrument.
Figure 3B:
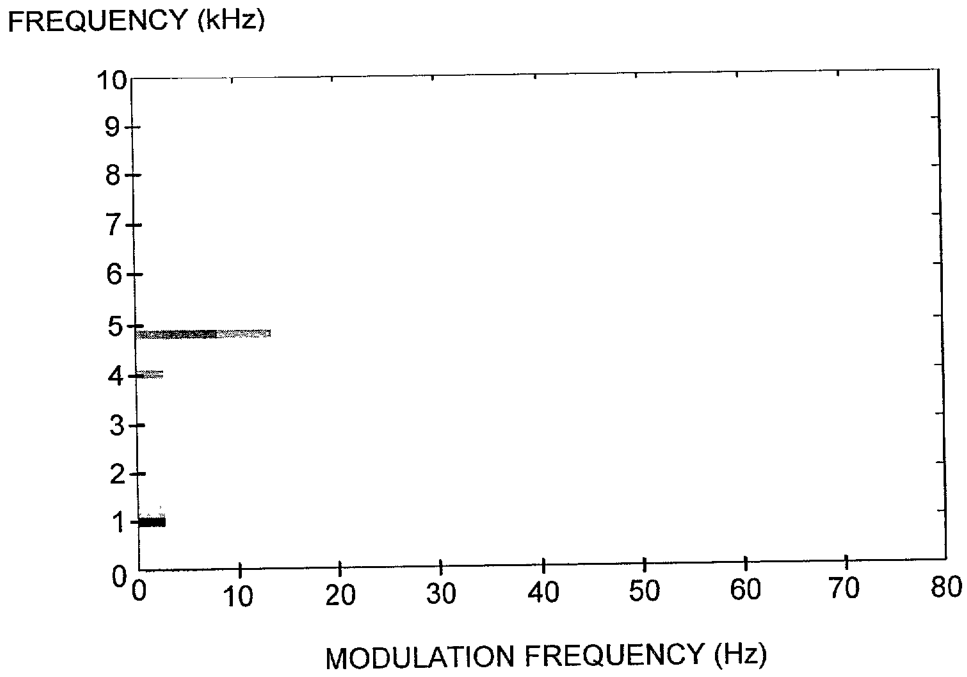
FIG. 3B is a graph showing the modulation frequencies that result when the second transform is applied.

FIGS. 3A and 3B depict an example of a spectrogram and modulation frequency graph, respectively, that result when the base transform and second transform are applied to two auditory notes of a glockenspiel musical instrument. FIG. 3A shows the spectrogram of the two notes, where the first note starts at time zero, and the second note begins at approximately 60 ms later. The first note has predominant tones at frequencies of approximately 1 kHz, 4 kHz, and 7.5 kHz. The second note has predominant tones at frequencies of approximately 4.5 kHz and 9 kHz. This illustration is an example of a known hard-to-encode signal, due to the abrupt change of note.

FIG. 3B shows the modulation frequencies that result when the second transform of the present invention is applied as described above. A key feature of the 2D transform discussed above is its capacity to isolate relevant information within the low frequencies of the modulation frequency axis. As expected, most of the energy from the notes is constrained to lower modulation frequencies. For example, the first note tones at approximately 1 kHz, 4 kHz, and 7.5 kHz result in modulation frequencies of less than about 5 Hz. However, the sudden onset of the second note tones at approximately 4.5 kHz and 9 kHz results in significantly more energy and corresponding modulation frequencies of almost 10 Hz. As suggested above, the unusually large extent of the modulation frequency results from the abrupt change of note.

However, the perceptual importance of the tones drops with an increase in modulation frequency. If the lengths of the block transforms in each dimension are selected carefully, cutting out high modulation frequency information only leads to damping of transient spectral changes, which is not perceptually annoying. Thus, the invention exploits the 2D transform's capacity to isolate relevant information within the low modulation frequencies in order to obtain high quality at low data rates, and also to achieve scalability.

It must be emphasized that the present invention is applicable to almost any type of signal that does not require retention of all of the data conveyed by the signal. For example, the present invention can be applied to video data, since perceptually less important data can be omitted from the signal recovered from data packets formed in accord with the present invention. The present invention is particularly applicable to forming data packets of perceptual data, since the effects on a signal produced using data packets from which less important data have been truncated by the present invention is generally very acceptable when aurally and/or visually perceived by a user.

In addition to it use in producing data packets for transmission over a network, the present invention is equally applicable in creating data packets that require less storage space on a storage medium. For example, the present invention can substantially increase the amount of music stored as data packets on a memory medium or other storage device. A user might select a specific bit size for each data packet to establish the number of bits of the data encoded into each data packet, to achieve a desired storage level of the resulting data packets on a limited storage medium. The user can make the decision whether to store larger data packets with even less perceptual loss, or smaller data packets with slightly more perceptual loss in the signal produced from the data packets, for example, when the signal is played back through headphones or speakers.

Details of the Decoder

Figure 9:
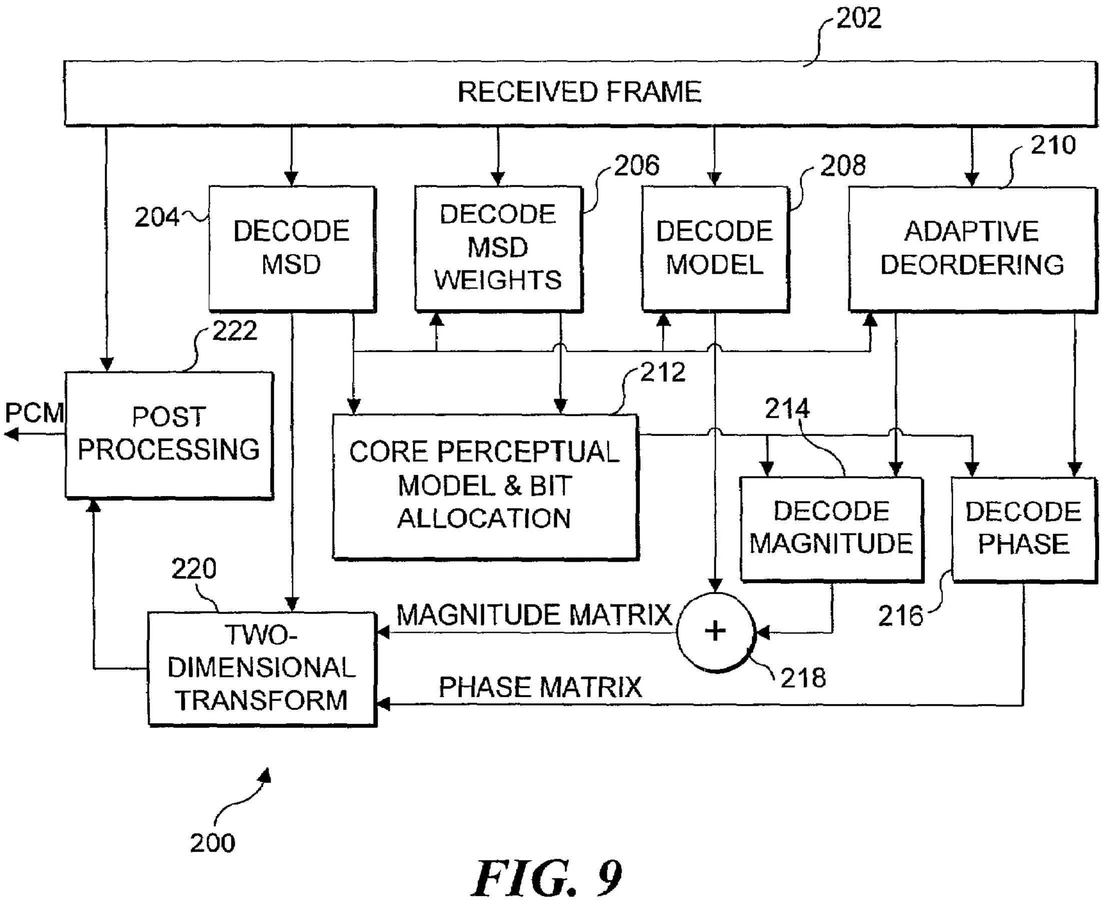
FIG. 9 is a functional block diagram showing the functions implemented in decoding frames in accord with the present invention.

An embodiment of a decoder 200 in accord with the present invention is shown in FIG. 9. Decoder 200 implements functions that are essentially the reverse of the encoding process. The decoder must first locate a synchronization word, which signifies the beginning of a packet or frame, that is received, as indicated in a block 202. Next, the MSD and MSD perceptual model weights are read and decoded in block 204 and 206, respectively. The MSD, and MSD model weights are then passed to a core perceptual model and bit allocation algorithm in a block 212, which perform the process described below. Template models are read and decoded in a block 208. The MSD, MSD weights, template models, and the characteristic gains are passed to an adaptive perceptual deordering algorithm in a block 210, which is described in greater detail below. In blocks 214 and 216, the magnitude and phase content are read into the decoder and reordered as determined by the adaptive deordering algorithm. Also, the magnitude and phase matrices are inverse quantized, and the template models are added to the magnitude matrix by in an adder 218. The resulting two-dimensional transform is inverted in a block 220, and the post processing is performed in a block 222, yielding standard PCM code for playback.

Core Perceptual Model and Bit Allocation

The weights used to shape the quantization noise for the MSD encoding coding represent spectral masking, and as a result, these weights can also be used to construct a perceptual model. As noted above, the MSD and the MSD weights are decoded in blocks 204 and 206. In the core perceptual model and bit allocation block 212, the decoded MSD and MSD weights are converted to a decibel (dB) scale. The weights are subtracted from the MSD to produce a signal to mask ratio (SMR) in every frequency bin.

The next step computes the number of bits to be used in each frequency bin for the remaining magnitude matrix and the phase matrix. In the encoding computations described above (during the calculation of the SMR), the bits are allocated such that in each frequency bin, the SNR is greater than the SMR. Thus, assuming that each bit allocated to the frequency bins leads to approximately 6 dB improvement in SNR, the SMR is divided by 6 dB, and the result is rounded to the nearest available bit allocation.

Perceptual Ordering of Data and Progressive Scalability

During the coding process, it will be recalled that the MSD is coded and placed on the data stream. Also during the encoding process, the magnitude matrix is normalized, modeled, quantized, and Huffman coded, and the phase matrix is quantized. The final step prior to the transmission of the encoded data is perceptual ordering, which allows for fine grain scalability. The perceptual ordering is preferably done adaptively, such that the most important information is transmitted to the decoder when the data bandwidth is limited. An example of perceptual ordering is to put the highest priority elements of the magnitude and phase matrix into the bit stream packet first, where low modulation frequencies (beyond the MSD) have priority over higher modulation frequencies.

The ordered data are packed into the bit stream packet such that when the maximum allowable bit count has been reached, transmission of the frame terminates and the transmission of the next frame begins. The same mechanism is used to achieve fine grain scalability, i.e., the frame of the coded sequence can be truncated at any arbitrary point above a predefined minimum threshold and then transmitted. This process is called "progressive scalability." Furthermore, the scaling mechanism requires no further computation and no recording of the audio data. Accordingly, the variable scalability of present invention readily enables perceptual data to be transmitted with a bit resolution determined by the available data bandwidth, with minimal adverse impact on the perceived quality of the perceptual data produced by adaptive deordering in the decoding process.

Results of Subjective Experiments

Informal empirical experiments showed that, for most audio signals, the overall information contained in the 2D transform can be reduced by more than 75 percent before the onset of any significant perceivable degradation. To confirm this, a simple subjective test was performed to determine the qualitative performance of the invention. The experimental protocol was as follows:

Subjects were presented with three versions of each audio selection: the unencoded original, an encoded signal A, and an encoded signal B. Subjects could listen to each selection as many times as desired. In each test, subjects were asked to indicate which, if any, of the encoded signals were of higher quality. Three different pairs of signals were used for the encoded A and B signals (as presented herein, the encoding rates are bits/sec/channel):

Group 1: present invention at 32 kb/s vs. unencoded original

Group 2: present invention at 32 kb/s vs. MP3 at 48 kb/s

Group 3: present invention at 32 kb/s vs. MP3 at 56 kb/s

The MPEG-1 Layer 3 (MP3) encoder used was the International Standards Organization (ISO) MPEG audio software simulation group's source code.

The encoder in accord with the present invention, which was used in this test, had a block size of 185 ms for the sample rate of 44.1 kHz. Each such test was performed using the following three songs:

Roxette "Must Have Been Love;"

Duran Duran "Notorious;" and

Go West "King of Wishful Thinking."

Figure 4:
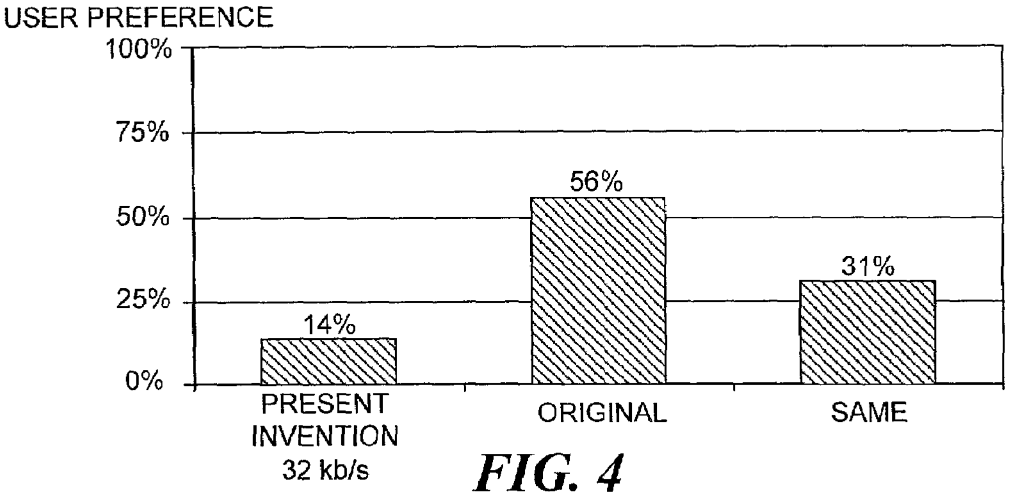
FIG. 4 is a bar graph showing cumulative results of tests comparing the present invention operating at a data rate of 32 kb/s per channel to an original 44.1 kHz sampling rate encoded CD source.
Figure 5:
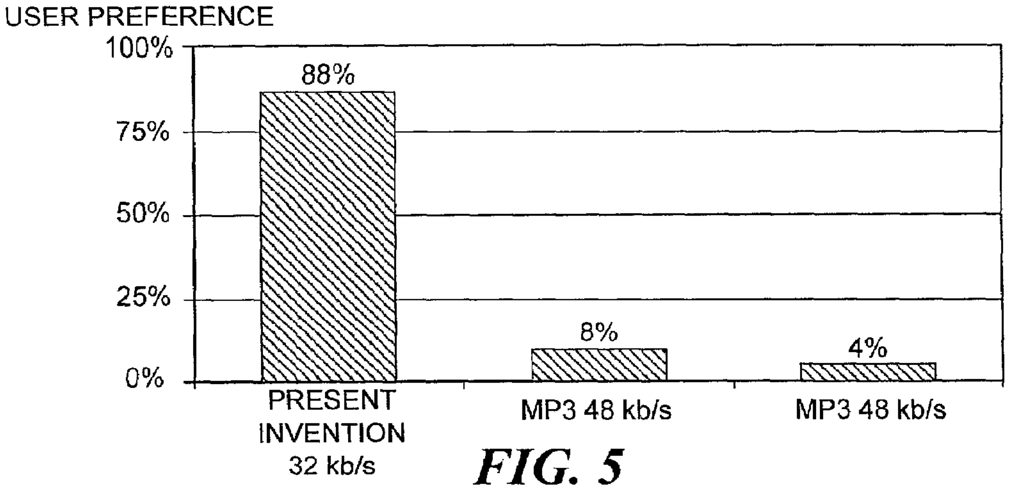
FIG. 5 is a bar graph showing cumulative results of tests comparing the perceived sound quality of data encoded with the present invention and conveyed at a data rate of 32 kb/s, to the same source encoded as an MP3 file conveyed at a data rate of 48 kb/s.
Figure 6:
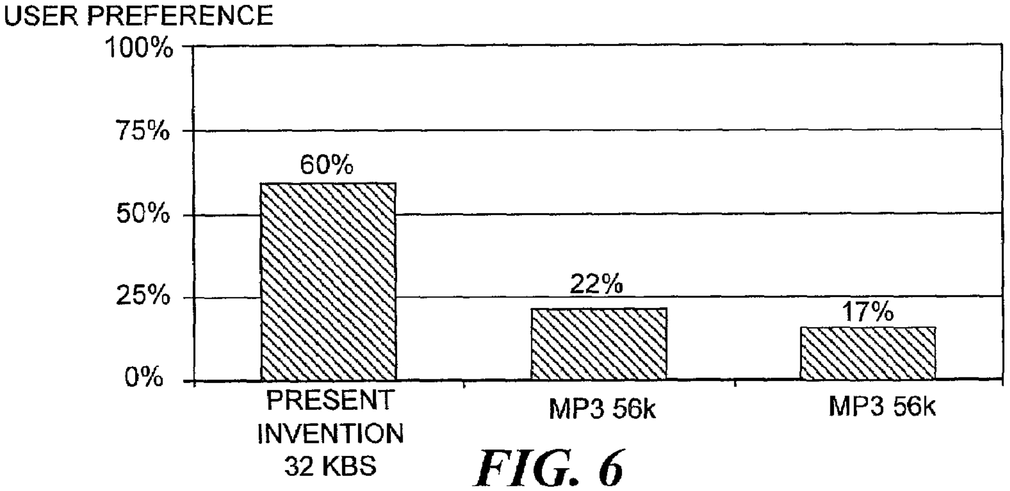
FIG. 6 is a bar graph showing cumulative results of tests comparing the perceived sound quality of data encoded with the present invention and conveyed at a data rate of 32 kb/s, to the same source encoded as an MP3 file conveyed at a data rate of 56 kb/s.

A total of 25 people participated in this experiment. The cumulative results are shown in FIGS. 4 through 6. FIG. 4 shows the cumulative results for the tests comparing the algorithm of the present invention at a data rate of 32 kb/s per channel, to the original 44.1 kHz compact disk source. A slight majority (56 percent) of subjects preferred the original source. The rest of the subjects could not distinguish the difference, or they preferred the version encoded with the present invention. FIG. 5 shows the results from the comparison of the present invention at a data rate of 32 kb/s to a corresponding MP3 coded transmission at a data rate of 48 kb/s, indicating that the results obtained with the present invention were clearly preferable. FIG. 6 shows a comparison of the results obtained with the present invention at a data rate of 32 kb/s with the MP3 coding transmitted at data rate of 56 kb/s per channel, which demonstrates a similar strong trend verifying the advantages of the present invention.

Exemplary Applications of the Present Invention

The following list, which is not complete, includes several exemplary applications for the technology disclosed herein. In each of these applications of the present invention, perceptual data encoded in packets can readily be transmitted between sites, stored, and/or distributed in an efficient manner. The raw data rate required to encode, store, decode, and playback analog signals, especially music signals, is substantially reduced using the present invention, which clearly offers advantages in distributing almost any perceptual signal data over a network on which the data rate may be limited. Exemplary applications of the present invention include the following:

- Listening, sampling, or purchasing music via electronic distribution systems such as conventional or future digital storage media, music store kiosks, digital audio broadcasting, and other encoding of data for radio broadcast will benefit from the reduction in the data rate required to transmit music, compared to other approaches currently used. The scalability of the present invention offers increased user and/or distributor choice of data rate capacity versus sound quality.
- Listening, sampling or purchasing music via shared electronic distribution or broadcast systems such as the Internet, cellular channels, or other packet-switched and/or shared networks or channels will also benefit from the reduced requirement of data rate provided by the present invention. The scalability of the present invention offers a better match to the variable data speed of these shared channels, delivering high quality sound and easier transmission, while readily facilitating scaling of the data reduction rate as required.
- The present invention is particularly applicable to the listening, sampling, or purchasing music via shared electronic distribution or broadcast systems such as the Internet, cellular channels, or other packet-switched and/or shared networks or channels. The scalability of data rate reduction provided by the present invention, when combined with scaled loss protection via error correction, provides a solution to the common problem of packet loss on these channels or networks.
- The fingerprinting of music or other audio material whereby a unique code can be derived and applied in digital rights management applications is another application for the present invention. This code will, after analysis of a passage of music using the transform technique described above, efficiently and uniquely represent a music passage.
- The present invention can enable the progressive playback of music wherein a lower-quality version of music is decoded and played, while a memory buffers fill with the information needed for higher-quality versions of the music. As the buffer fills, progressively higher quality music is decoded and played. By employing progressive decoding, a listener will be provided substantially instantaneous feedback about the songs or other content when new audio streams are selected, enabling the listener to more rapidly make decisions regarding music to be downloaded.
- The present invention is applicable to the modification or morphing of music, to produce new musical or sound effects. Music or sounds with different characters can be combined and/or smooth transitions can be made between them. Furthermore, modifications can be made to existing music or sounds to change the pace or other characteristics of the music as the data representing the music are encoded (or when the data are decoded).
- The above applications are also applicable to speech material as well as video material, and thus, are not limited to music.
- A substantially different application of the present invention is the compression of ambient sounds for sound amplification in hearing aids. The dynamic range is compressed by eliminating or filtering selected modulation frequency components.

Computer System Suitable for Implementing the Present Invention

Figure 7:
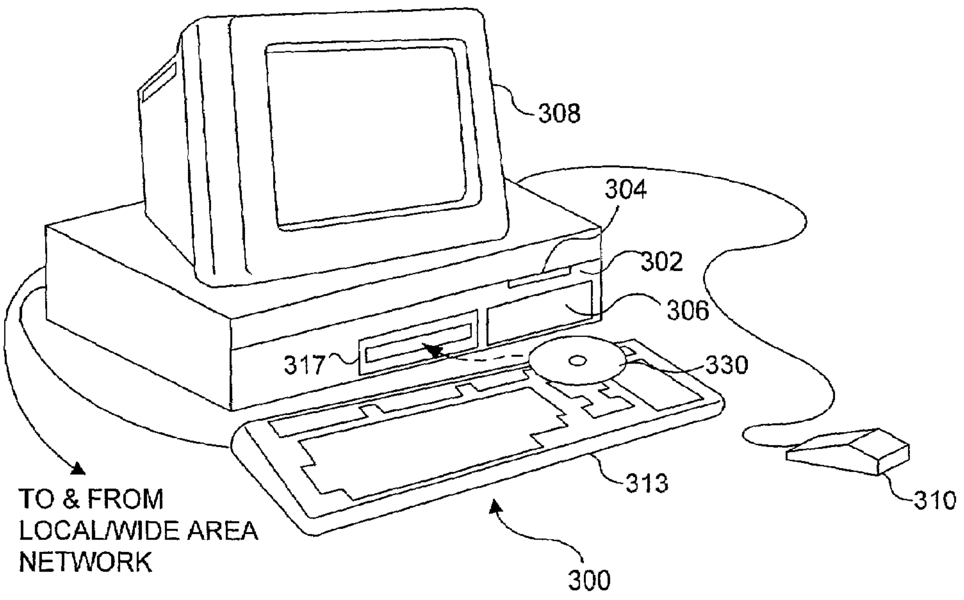
FIG. 7 is a schematic functional block diagram of a conventional personal computer suitable for implementing the present invention.

With reference to FIG. 7, a generally conventional personal computer 300 is illustrated, which is suitable for use in connection with practicing the present invention. Alternatively, a portable computer, or workstation coupled to a network, and/or a server may instead be used. It is also contemplated that the present invention can be implemented on a non-traditional computing device that includes only a processor, a memory, and supporting circuitry. A non-traditional computing device may include a personal music recorder/player, or other audio/visual device.

Many of the components of the personal computer discussed below are generally similar to those used in each alternative computing device on which the present invention might be implemented, however, a server is generally provided with substantially more hard drive capacity and memory than a personal computer or workstation, and generally also executes specialized programs enabling it to perform its functions as a server.

Personal computer 300 includes a processor chassis 302 in which are mounted a floppy disk drive 304, a hard drive 306, a motherboard populated with appropriate integrated circuits (not shown), and a power supply (also not shown), as are generally well known to those of ordinary skill in the art. A monitor 308 is included for displaying graphics and text generated by software programs that are run by the personal computer. A mouse 310 (or other pointing device) is connected to a serial port (or to a bus port or other data port) on the rear of processor chassis 302, and signals from mouse 310 are conveyed to the motherboard to control a cursor on the display and to select text, menu options, and graphic components displayed on monitor 308 by software programs executing on the processor of the personal computer. In addition, a keyboard 313 is coupled to the motherboard for user entry of text and commands that affect the running of software programs executing on the personal computer.

Personal computer 300 also optionally includes a CD drive 317 (or other optical data storage device) into which a CD 330 (or other type of optical data storage media) may be inserted so that executable files, music, video, or other data on the disk can be read and transferred into the memory and/or into storage on hard drive 306 of personal computer 300. Personal computer 300 may implement the present invention in a stand-alone capacity, or may be coupled to a local area and/or wide area network as one of a plurality of such computers on the network that access one or more servers.

Figure 8:
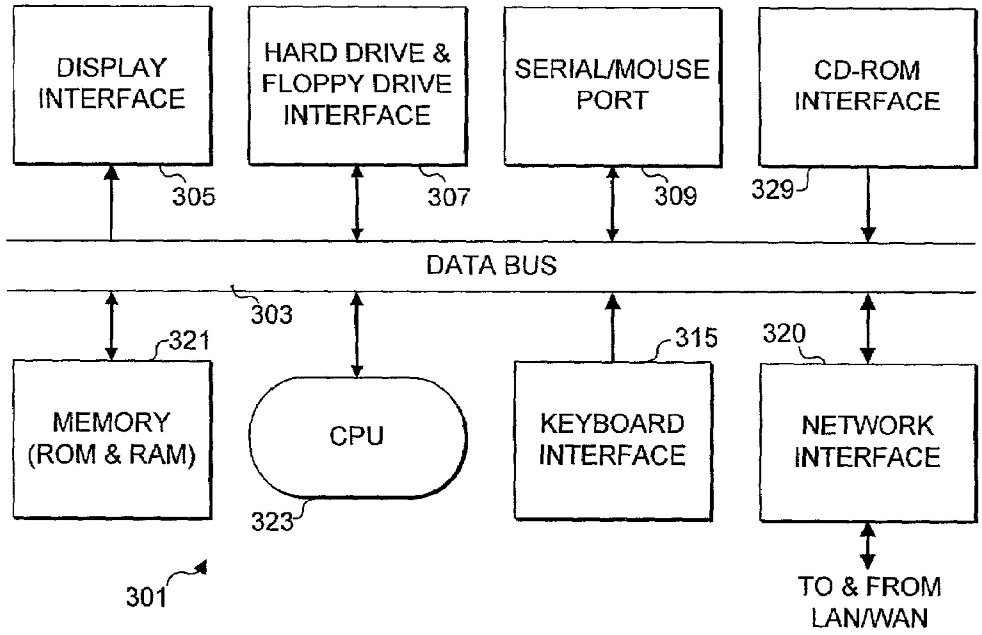
FIG. 8 is a schematic block diagram showing some of the functional components that are included within the processor chassis of the personal computer of FIG. 7.

Although details relating to all of the components mounted on the motherboard or otherwise installed inside processor chassis 302 are not illustrated, FIG. 8 is a block diagram showing some of the functional components that are included. The motherboard has a data bus 303 to which these functional components are electrically connected. A display interface 305, comprising a video card, for example, generates signals in response to instructions executed by a central processing unit (CPU) 323 that are transmitted to monitor 308 so that graphics and text are displayed on the monitor. A hard drive and floppy drive interface 307 is coupled to data bus 303 to enable bi-directional flow of data and instructions between the data bus and floppy drive 304 or hard drive 306. Software programs executed by CPU 323 are typically stored on either hard drive 306, or on a floppy disk (not shown) that is inserted into floppy drive 304. Similarly, other types of storage devices, such as the CD drive noted above, are coupled to the data base. The software instructions for implementing the present invention will likely be distributed either on floppy disks, or on a CD or some other portable memory storage medium, or over a network to which the personal computer is coupled. The machine instructions comprising the software application that implements the present invention will be loaded into the memory of the personal computer for execution by CPU 323. It is also contemplated that these machine instructions may be stored on a server for an organization and accessible for execution by computing devices coupled to the server, or might even be stored in read only memory (ROM) of the computing device.

A serial/mouse port 309 (representative of the one or more input/output ports typically provided) is also bi-directionally coupled to data bus 303, enabling signals developed by mouse 310 to be conveyed through the data bus to CPU 323. It is also contemplated that a universal serial bus (USB) port and/or a IEEE 1394 data port (not shown) may be included and used for coupling peripheral devices to the data bus. A CD-ROM interface 329 connects CD drive 317 to data bus 303. The CD interface may be a small computer systems interface (SCSI) type interface, and integrated drive electronics (IDE) interface, or other interface appropriate for connection to CD drive 317.

A keyboard interface 315 receives signals from keyboard 313, coupling the signals to data bus 303 for transmission to CPU 323. Optionally coupled to data bus 303 is a network interface 320 (which may comprise, for example, an ETHERNET™ card for coupling the personal computer or workstation to a local area and/or wide area network, and/or to the Internet).

When a software program such as that used to implement the present invention is executed by CPU 323, the machine instructions comprising the program that are stored on a floppy disk, a CD, the server, or on hard drive 306 are transferred into a memory 321 via data bus 303. These machine instructions are executed by CPU 323, causing it to carry out functions determined by the machine instructions. Memory 321 includes both a nonvolatile ROM in which machine instructions used for booting up personal computer 300 are stored, and a random access memory (RAM) in which machine instructions and data produced during the processing of the signals in accord with the present invention are stored.

Although the present invention has been described in connection with the preferred form of practicing it and modifications thereto, those of ordinary skill in the art will understand that many other modifications can be made to the invention within the scope of the claims that follow. For example, as indicated above, the second transform and perceptual ranking could be performed on the phase coefficients of the base transform. Perceptual models could be applied for masking or weighting in the modulation frequency (independently or jointly with the original frequency subband). Non-uniform quantization could be used. Other forms of detecting modulation could be used, such as Hilbert envelopes. A number of optimizations could be applied, such as optimizing the subband and frequency resolutions. The spacing for modulation frequency could be non-uniform (e.g., logarithmic spacing). In addition to the specific second transform described above, other transforms could be used, such as non-Fourier transforms and wavelet transforms. Any second transform providing energy compaction into a few coefficients and/or rank ordering in perceptual importance would provide similar advantages for time signals. Also, it is again emphasized that the second transform can be used in any application requiring an encoding of time-varying signals, such as video, multimedia, and other communication data. Further, the 2D representation resulting from the second transform can be used in applications that require sound, image, or video mixing, modification, morphing, or other combinations of signals. Accordingly, it is not intended that the scope of the invention in any way be limited by the above description, but instead be determined entirely by reference to the claims that follow.

The invention in which an exclusive right is claimed is defined by the following:

1. A method for encoding a signal for storage or transmission, comprising the steps of:

(a) implementing a two-dimensional transform of the signal, producing a transform matrix having modulation frequency as one dimension, wherein said one dimension is a spectral representation of a time variability of a spectra of the signal;

(b) reducing a dynamic range of the signal;

(c) quantizing and selecting coefficients included in the transform matrix; and (d) producing data packets in which the coefficients that have been selected are encoded based upon a desired order of the coefficients, with coefficients that are more perceptually relevant being used first to fill each data packet and coefficients that are less perceptually relevant being handled in one of the following ways:

(i) discarded once an available space in each data packet that is to be stored or transmitted has been filled with the coefficients that are more perceptually relevant; and (ii) disposed last within each data packet, so that the coefficients that are less perceptually relevant can subsequently be truncated from the data packet.

2. The method of claim 1, wherein the step of implementing the two-dimensional transform produces a phase matrix and a magnitude matrix, said magnitude matrix having the modulation frequency as one of its dimensions and including a mean spectral density function of the signal.

3. The method of claim 2, further comprising the step of determining weighting factors for use in reducing the dynamic range of the signal, based upon a perceptual model.

4. The method of claim 3, wherein the step of determining the weighting factors comprises the step of using the perceptual model to compute weighting factors from coefficients of the mean spectral density function.

5. The method of claim 3, further comprising the steps of converting the weighting factors to a logarithmic scale; and thereafter, quantizing the weighting factors.

6. The method of claim 5, farther comprising the step of inverse quantizing the weighting factors to produce inverse quantized weighting factors.

7. The method of claim 6, farther comprising the steps of preparing the mean spectral density function for quantization using the inverse quantized weighting factors; and quantizing the means spectral density function thus prepared, producing a quantized mean spectral density function.

8. The method of claim 7, wherein the quantized mean spectral density function is also encoded into the data packets.

9. The method of claim 7, farther comprising the step of producing an inverse quantized mean spectral density function.

10. The method of claim 9, further comprising the step of processing the inverse quantized mean spectral density function with the perceptual model to produce bit allocations used for encoding the data packets.

11. The method of claim 10, further comprising the step of quantizing the phase matrix and the magnitude matrix using a number of bits determined by the perceptual model.

12. The method of claim 2, further comprising the step of quantizing the magnitude matrix to produce a quantized magnitude matrix, wherein the step of producing the data packets comprises the step of coding the quantized magnitude matrix with one of a fixed code and a variable length code.

13. The method of claim 1, wherein the step of producing the data packets includes the step of ordering the data corresponding to the signal with respect to their perceptual relevance so that data having lower modulation frequencies and lower base-transform frequencies are inserted into a data packet before data having higher modulation frequencies and higher base-transform frequencies.

14. The method of claim 1, wherein the step of implementing the two-dimensional transform includes the steps of:
- (a) transforming even numbered window sequences by a discrete cosine transform to form an even transform sequence;
- (b) transforming odd numbered window sequences by a discrete sine transform to form an odd transform sequence; and
- (c) forming an orthogonal complex pair by combining the even transform sequence with the odd transform sequence.

15. The method of claim 14, further comprising the step of applying a second transform to the orthogonal complex pair.

16. A method for encoding data packets with data derived from a perceptual signal, said data packets being stored as originally encoded, or stored in a truncated form, or transmitted in a truncated form over a network at a data rate that may be less than required to transmit non-truncated data packets, comprising the steps of:
- (a) applying a two-dimensional transform to the signal to produce a transform matrix having modulation frequency as one dimension;
- (b) quantizing a mean spectral density derived from the transform matrix, to produce a quantized mean spectral density;
- (c) determining an inverse quantized mean spectral density using the quantized mean spectral density;
- (d) deriving bit allocations from the inverse quantized mean spectral density using a perceptual model;
- (e) as a function of the bit allocations and the results of the two-dimensional transform, producing quantized components; and
- (f) determining an order in which the perceptual data are loaded into each data packet, based upon the quantized components, wherein data that are perceptually more important are loaded closer to a beginning of the data packet, while data that are perceptually less important are handled in one of the following ways:
  - (i) loaded closer to an end of each data packet, if the entire data packet is to be stored in a non-truncated form; and
  - (ii) eliminated from the data packets, if said data packets are to be stored or transmitted over the network in the truncated form.

17. The method of claim 16, wherein the step of applying the two-dimensional transform produces a phase matrix and a magnitude matrix, said magnitude matrix having the modulation frequency as one of its dimensions and including a mean spectral density function of the signal.

18. The method of claim 16, further comprising the step of processing the perceptual signal with a perceptual model before applying the two-dimensional transform.

19. The method of claim 16, further comprising the step of reducing a dynamic range of the perceptual signal that is encoded into the data packets.

20. The method of claim 16, wherein the step of determining the order comprises the step of ordering data for the perceptual signal so that lower modulation frequencies and lower base-transform frequencies are inserted closer to the beginning of the data packets than higher modulation frequencies and higher base-transform frequencies.

21. A machine readable medium on which are stored a plurality of machine readable instructions for carrying out the steps of claim 16.

22. Apparatus for encoding data packets to include data derived from a perceptual signal, said data packets being stored as originally encoded, or stored in a truncated form, or transmitted in a truncated form over a network at a data rate that may be less than required to transmit non-truncated data packets, comprising:
- (a) a memory in which a plurality of machine instructions are stored;
- (b) a source of a perceptual signal to be encoded into data packets; and
- (c) a processor coupled in communication with the source of the perceptual signal, and the memory, said processor executing the machine instructions to carry out a plurality of functions, including:
  - (i) applying a two-dimensional transform to the perceptual signal, producing a transform matrix having modulation frequency as one dimension;
  - (ii) quantizing a mean spectral density of one component of the transform matrix, to produce a quantized mean spectral density;
  - (iii) determining an inverse quantized mean spectral density using the quantized mean spectral density;
  - (iv) deriving bit allocations from the inverse quantized mean spectral density using a perceptual model;
  - (v) as a function of the bit allocations and the transform matrix, producing quantized components; and
  - (vi) determining an order in which the perceptual data are loaded into each data packet, based upon the quantized components, so that data that are perceptually more important are loaded into a beginning of the data packet, while data that are perceptually less important are handled in one of the following ways:
    - (1) loaded closer to an end of each data packet; and
    - (2) eliminated from the data packets.

23. The apparatus of claim 22, wherein the two-dimensional transform produces a phase matrix and a magnitude matrix, said magnitude matrix having the modulation frequency as one of its dimensions and including a mean spectral density function of the perceptual signal.

24. The apparatus of claim 22, wherein the functions implemented by the processor when executing the machine instructions further comprise processing the perceptual signal with a perceptual model before applying the two-dimensional transform.

25. The apparatus of claim 22, wherein the functions implemented by the processor when executing the machine instructions farther comprise reducing a dynamic range of the perceptual signal that is encoded into the data packets.

26. The apparatus of claim 22, wherein the function of determining the order arranges the data encoded into the data packet so that data having lower modulation frequencies and lower base-transform frequencies are inserted closer to the beginning of the data packets than data having higher modulation frequencies and higher base-transform frequencies.

27. The apparatus of claim 23, further comprising a network interface that is coupled to the processor and used to transmit the data packets over a network to a recipient device that receives at least portions of each data packet transmitted over the network, said recipient device including:

(a) a recipient memory in which a plurality of machine instructions are stored;

(b) a recipient network interface coupled to the network to receive encoded data packets; and (c) a recipient processor that is coupled to the recipient network interface and to the recipient memory, said recipient processor executing the machine instructions stored in the recipient memory to carry out a plurality of functions for decoding each encoded data packet, including:

(i) decoding the mean spectral density and mean spectral density weights;

(ii) decoding template models from the encoded data packet;

(iii) decoding and reordering a magnitude content and a phase content from the encoded data packet;

(iv) inverse quantizing the magnitude matrix and the phase matrix;

(v) adding the template models to the inverse quantized magnitude matrix, said inverse quantized phase matrix and a result produced by thus adding comprising a two-dimensional transform;

(vi) inverting the two-dimensional transform; and (vii) performing post processing to yield a pulse code modulated signal corresponding to the perceptual signal.

28. The apparatus of claim 27, wherein the recipient processor, when executing the machine instructions, also implements the following functions for each data packet that is received:

(a) converts the mean spectral density and mean spectral density weights to a decibel scale;

(b) produces a signal-to-mask ratio for each of a plurality of frequency bins as a function of the means spectral density and the mean spectral density weights; and (c) computes a number of bits to be used in each frequency bin for a remaining magnitude matrix and a remaining phase matrix, such that a signal-to-noise ratio of the bits in the plurality of frequency bins is greater than the signal-to-mask ratio.

29. A method for perceptually ordering data within data packets that are sized as a function of either an available storage or an available data transmission bandwidth, comprising the steps of:

(a) determining a mean spectral density function of the data for inclusion in the data packets, wherein the data packets are sized as a function of one of an available storage, and an available data transmission bandwidth;

(b) determining a magnitude matrix and a phase matrix for the data;

(c) modeling the magnitude matrix;

(d) quantizing the magnitude matrix and the phase matrix for use in the data packets; and (e) perceptually ordering the data included in the data packets, so that perceptually more import ant data are inserted first into each data packet, and perceptually less important data are inserted successively thereafter to ensure that an available capacity of the data packets is filled with perceptually more important data in preference to the perceptually less important data.

30. The method of claim 29, further comprising the step of enabling a bit resolution of the data packets that defines the capacity of the data packets to be selectively scaled as a function of the data transmission bandwidth of a network over which the data packets are transmitted.

31. The method of claim 29, further comprising the step of enabling a bit resolution of the data packets that defines the capacity of the data packets to be selectively scaled as a function of a capacity of the available storage in which the data packets are stored.

32. The method of claim 29, further comprising the step of decoding the data packets to recover the data to create a perceptible signal adapted to provide a perceptible experience by a user, loss of the perceptually less important data from the data packets being perceptually less noticeable in the perceptible signal as perceived by the user than would be a loss of perceptually more important data.

33. The method of claim 29, further comprising the step of storing data packets from which the perceptually less important data have been excluded in a storage.

34. The method of claim 29, further comprising the step of transmitting data packets from which the perceptually less important data have been excluded, over a network.

35. The method of claim 29, further comprising the step of truncating perceptually less important data from the data packets as necessary to accommodate an available data transmission rate for a network channel over which the data packets are to be transmitted.

36. The method of claim 35, wherein perceptually less important data are truncated from the data packet to achieve a data packet size sufficiently small so that the data packets are transmitted over the network channel in a continuous stream and so that the data conveyed by the data packets are adapted to be perceptually experienced by a user in real time as the data packets are received.

* * * * *